M. N. KIRKHUFF.
CULTIVATOR.
APPLICATION FILED NOV. 10, 1911.
1,025,874.
Patented May 7, 1912.
3 SHEETS—SHEET 1.
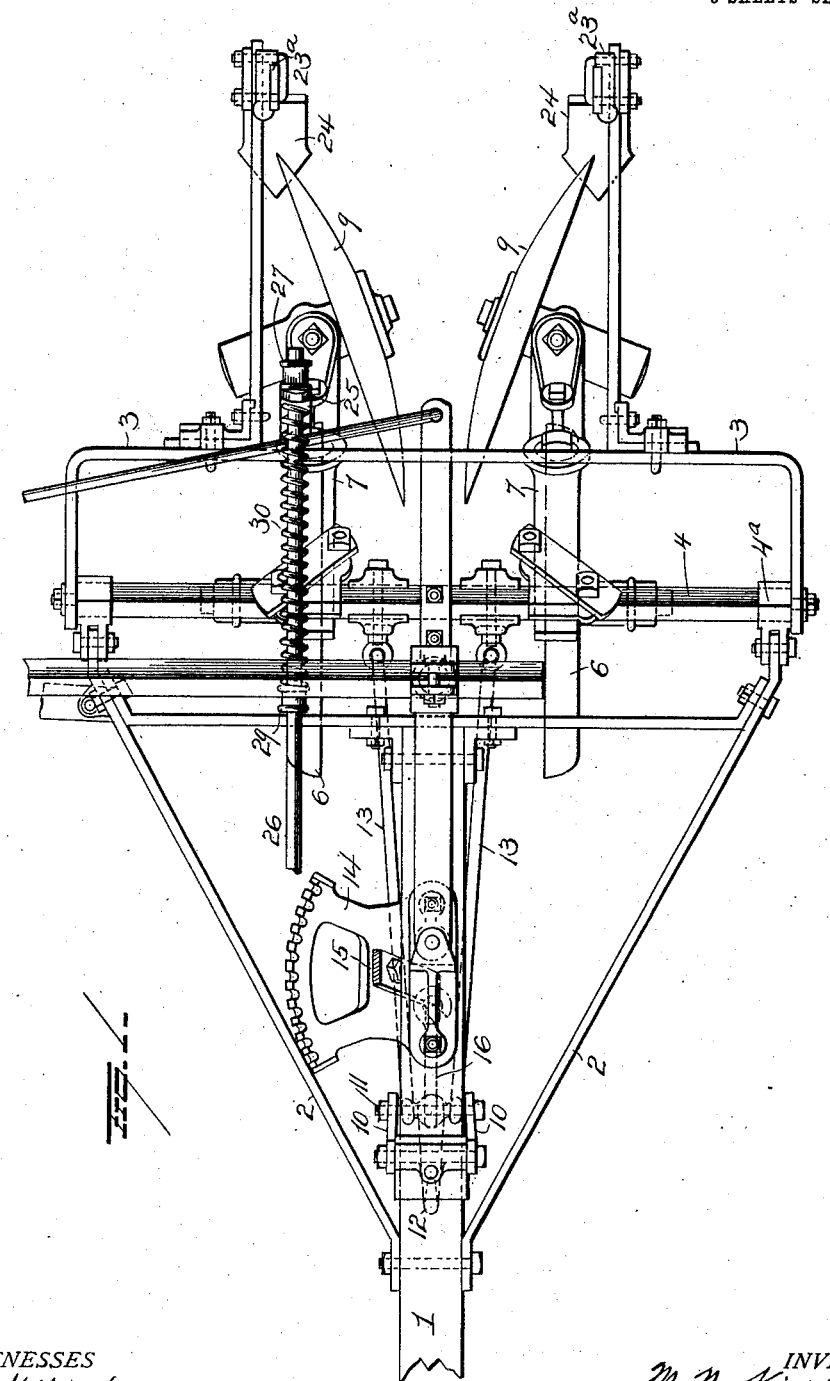
WITNESSES
INVENTOR
Attorney

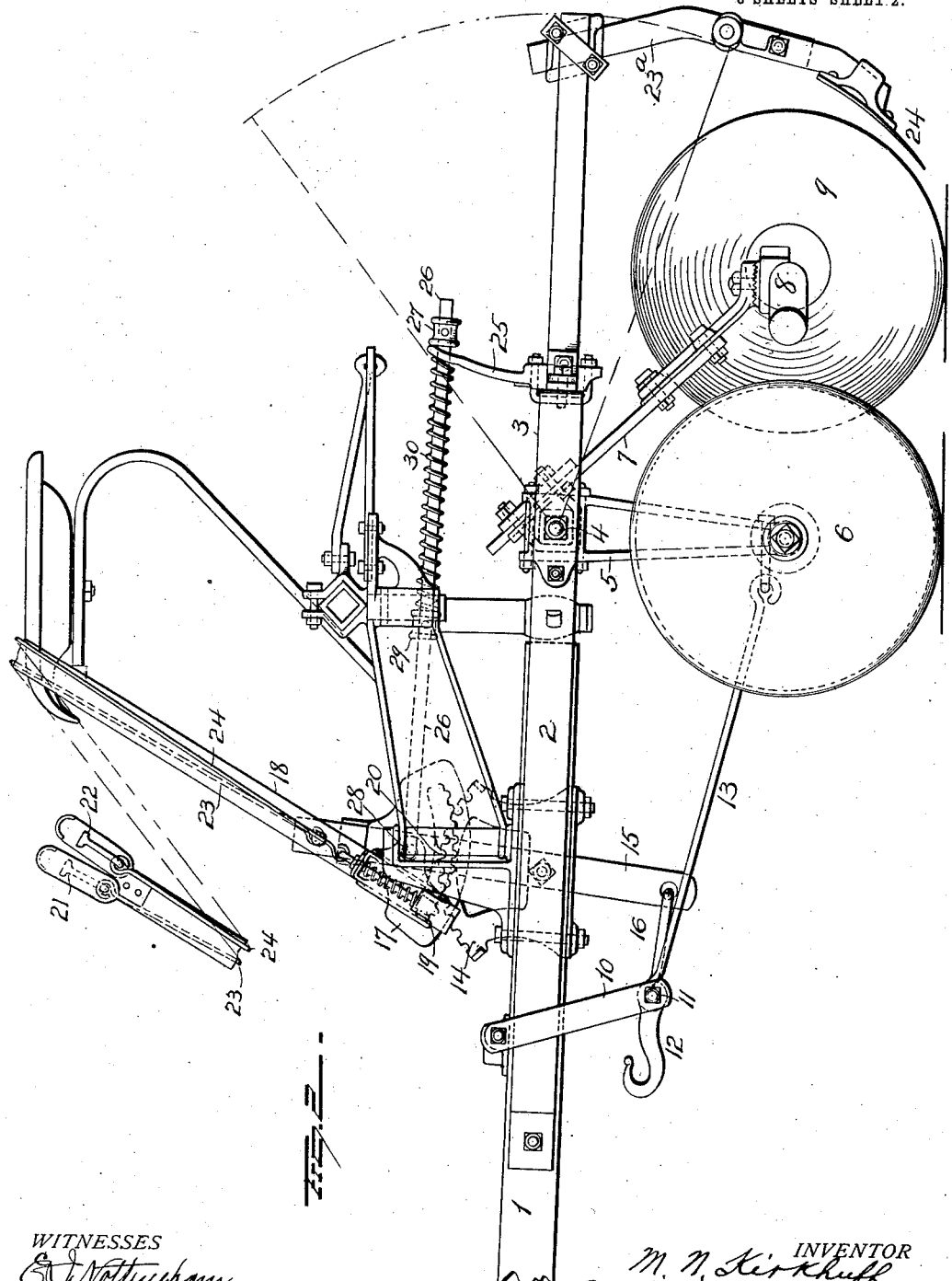

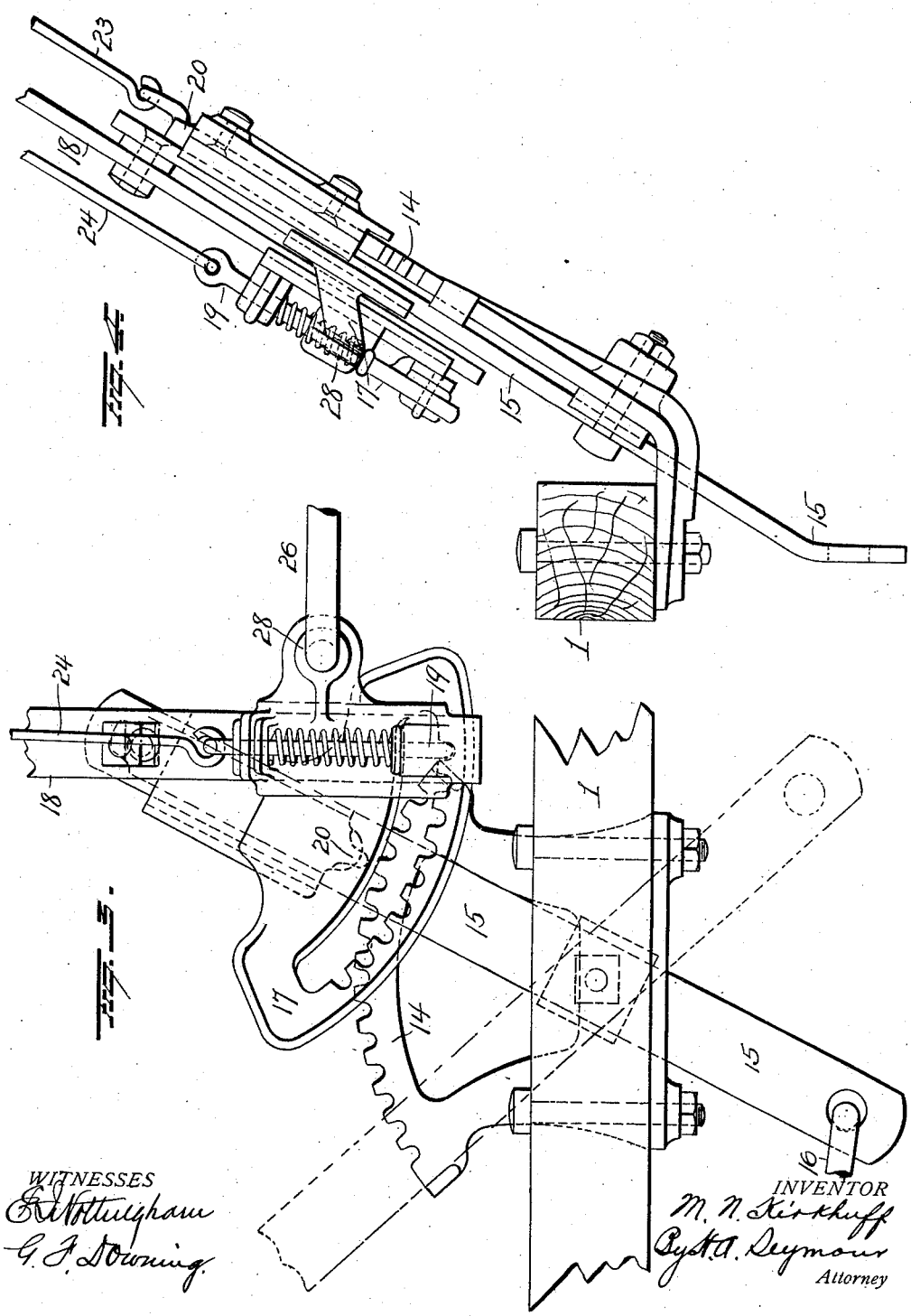

UNITED STATES PATENT OFFICE.

MARSHALL N. KIRKHUFF, OF SOUTH BEND, INDIANA, ASSIGNOR TO OLIVER CHILLED PLOW WORKS, OF SOUTH BEND, INDIANA.

CULTIVATOR.

1,025,874.      Specification of Letters Patent.      Patented May 7, 1912.

Application filed November 10, 1911. Serial No. 659,615.

*To all whom it may concern:*

Be it known that I, MARSHALL N. KIRKHUFF, a citizen of the United States, residing at South Bend, in the county of St. Joseph and State of Indiana, have invented certain new and useful Improvements in Cultivators; and I do hereby declare the following to be a full, clear, and exact description of the invention, such as will enable others skilled in the art to which it appertains to make and use the same.

This invention relates to improvements in cultivators and more particularly to lifting means for the soil engaging members of list cultivators,—the object of the invention being to provide simple and efficient means whereby, with the manipulation of a single lever, the cultivator disks and shovels can be simultaneously raised and lowered or the shovels raised or lowered independently of the disks.

With this object in view the invention consists in certain novel features of construction and combinations of parts as hereinafter set forth and pointed out in the claims.

In the accompanying drawings, Figure 1 is a plan view of a lister cultivator with which my improvements are adapted for use. Fig. 2 is a side elevation of the cultivator, and Figs. 3 and 4 are enlarged detail views of the lever mechanism.

My improvements have been designed more particularly for use with lister cultivators of that type in which two cultivator members are spaced apart and connected by a transverse bar with a seat located on said bar and with lifting levers so disposed that they can be easily reached by the operator from said seat. My improvements however are adaptable for use on any cultivator employing two sets of soil engaging members, such as disks and shovels, and it is desired to accomplish the independent manipulation of the two types of soil engaging members.

1 represents a tongue or pole with which a fixed frame 2 is connected and with this fixed frame, a vertically movable frame 3 is pivotally connected. A rocking bar 4 is mounted transversely in the fixed frame 2, in brackets 4ª attached to said frame 2 and the movable frame 3 is attached to said bar 4. Brackets or hangers 5 are clamped to and depend from the said rocking bar 4 and at their lower ends carry bearings for the journals of wheels 6 which serve to sustain the cultivator frame and parts carried thereby.

Adjustable arms or bars 7 are clamped to the rocking bar 4 and extend rearwardly and downwardly therefrom. At the rear ends of said arms or bars, bearings 8 are secured for the accommodation of cultivator disks 9.

Pivoted links 10 depend from the forward portion of the cultivator frame and at their lower ends, carry a transverse bolt 11 with which a draft hook 12 is connected. Draft rods 13 are connected at their forward ends with the bolt 11 and at their rear ends with the bearings of carrying wheels 6.

A toothed segment 14 is secured to the forward portion of the cultivator frame work and to this segment, a lever member 15 is pivotally attached between its ends. The lower end of this lever member is connected, by means of a link 16, with the bolt 11 of the draft devices. The upper portion of the lever member 15 has secured thereto a toothed segment 17 and above this segment, a lever member 18 is pivotally connected with the lever member 15. The lever member 18 carries a spring actuated detent 19 which normally engages the segment 17 and thus locks the lever members 15 and 18 normally together. The lever member 18 also carries a spring pressed detent 20 to engage the toothed segment 14 and suitable finger levers 21—22 and connecting rods 23—24 are provided for manipulating the detents 19 and 20.

To the horizontal member of the vertical movable portion 3 of the cultivator frame, the upper ends of standards 23ª are secured and to the lower ends of these standards, shovels 24 are secured,—the standards being so located and proportioned that the shovels will travel in rear of the disks 9.

An arm 25 is secured to and projects upwardly from the vertically movable frame 3,—said arm being provided at its upper end with an opening through which a rod 26 passes. This rod is provided with a collar 27 which bears against the arm 25 and the said rod extends forwardly from the arm 25 and is connected with the lever member 18 at 28. A collar 29 is also located on the rod 26 some distance forwardly of the arm 25 and between this collar and the arm 25, a spring 30 is located on the rod.

It will be seen that when the detent 19 is in locked engagement with the segment 17, the two members of the lifting lever will be locked together and that when this two part lifting lever is then shifted forwardly, it will turn on the pivotal support of the lower lever member 15 and cause rearward movement of the wheels 6 and a rocking of the rocking bar 4. The cultivator disks being connected with this rocking bar through the medium of the arms or bars 7, they will be raised when the rocking bar is turned as above explained. At the same time that the two part operating lever is moved forwardly, motion will be transmitted by the rod 26 to the arm 25 and the vertically movable frame 3 will be raised and the shovels will therefore be elevated.

When it is desired to elevate the shovels without raising the cultivator disks, the detent 19 will be moved out of engagement with the segment 17 to unlock the lever member 18 from the lever member 15 and the upper lever member 18 will then be moved forwardly, transmitting motion through the rod 26 to the arm 25 and raising the frame 3 to elevate the shovels.

Having fully described my invention what I claim as new and desire to secure by Letters-Patent, is,—

1. In a cultivator, the combination with a frame, a rocking bar mounted therein, hangers depending from said rocking bar, and carrying wheels at the lower ends of said hangers, of cultivator disks connected with said rocking bar, a vertically movable frame, shovels carried by said frame, a pivoted lever section, connections between said lever section and said hangers, an upper lever section pivoted to the pivoted lever section below the upper end of the latter, means for locking the lever sections together, and connections between the upper lever section and the vertically movable frame carrying the shovels.

2. The combination with a main frame, a rocking bar, hangers depending from the rocking bar, carrying wheels at the lower ends of said hangers, cultivator disks connected with the rocking bar, a vertically movable frame, and shovels carried by the latter, of a lever comprising upper and lower sections pivoted together, the lower of said lever sections being pivotally supported on the main frame, locking means for the lever sections, a swinging link depending from the main frame, a connection between said link and the lower lever section, and connections between said link and said hangers below the upper ends of the latter.

In testimony whereof, I have signed this specification in the presence of two subscribing witnesses.

MARSHALL N. KIRKHUFF.

Witnesses:
 EDWIN NICAR,
 R. O. MORGAN.

---

Copies of this patent may be obtained for five cents each, by addressing the "Commissioner of Patents, Washington, D. C."